March 13, 1956 W. A. LEDWITH 2,738,125
LOCKING MEANS BETWEEN COMPRESSOR AND TURBINE
Filed June 19, 1951 2 Sheets-Sheet 2

Inventor
Walter A. Ledwith
by Charles A. Warren
Attorney though to the drawings which illustrate an embodiment of the invention.

United States Patent Office 2,738,125
Patented Mar. 13, 1956

2,738,125

LOCKING MEANS BETWEEN COMPRESSOR AND TURBINE

Walter A. Ledwith, Glastonbury, Conn., assignor to United Aircraft Corporation, East Hartford, Conn., a corporation of Delaware Application June 19, 1951, Serial No. 232,398

6 Claims. (Cl. 230—116)

The present invention relates to an arrangement for locking the compressor and turbine rotors of a gas turbine power plant together.

In many gas turbine constructions, in facilitating the assembly of the power plant, it is necessary to fasten the compressor and turbine rotors together by a structure located within the rotor shafts, the arrangement being such that the locking means is accessible through either the compressor or turbine rotor. A feature of this invention is an arrangement by which to hold the rotors together with an arrangement for locking the holding means in position to prevent accidental disengagement.

Another feature of the invention is an arrangement of the holding means such that disengagement of the holding means will urge the two rotors apart to make disassembly easier.

Another feature is the construction of the holding means as a part of one of the rotors so that it becomes a part of the rotor assembly and may be balanced with the rotor.

The holding means which keeps the rotors together may be engaged or disengaged by the use of a wrench which would be inserted axially through one or the other of the rotors for engagement with the holding means so that the latter may be turned either for engagement or disengagement. A feature of the invention is a locking means for the holding device which will be unlocked by the insertion of the wrench. The invention preferably involves a locking means which is resiliently urged into operative position so that upon removal of the wrench in assembling the rotors the locking means is automatically made operative.

Other objects and advantages will be apparent from the specification and claims, and from the accompanying drawings which illustrate an embodiment of the invention.

Figure 1:
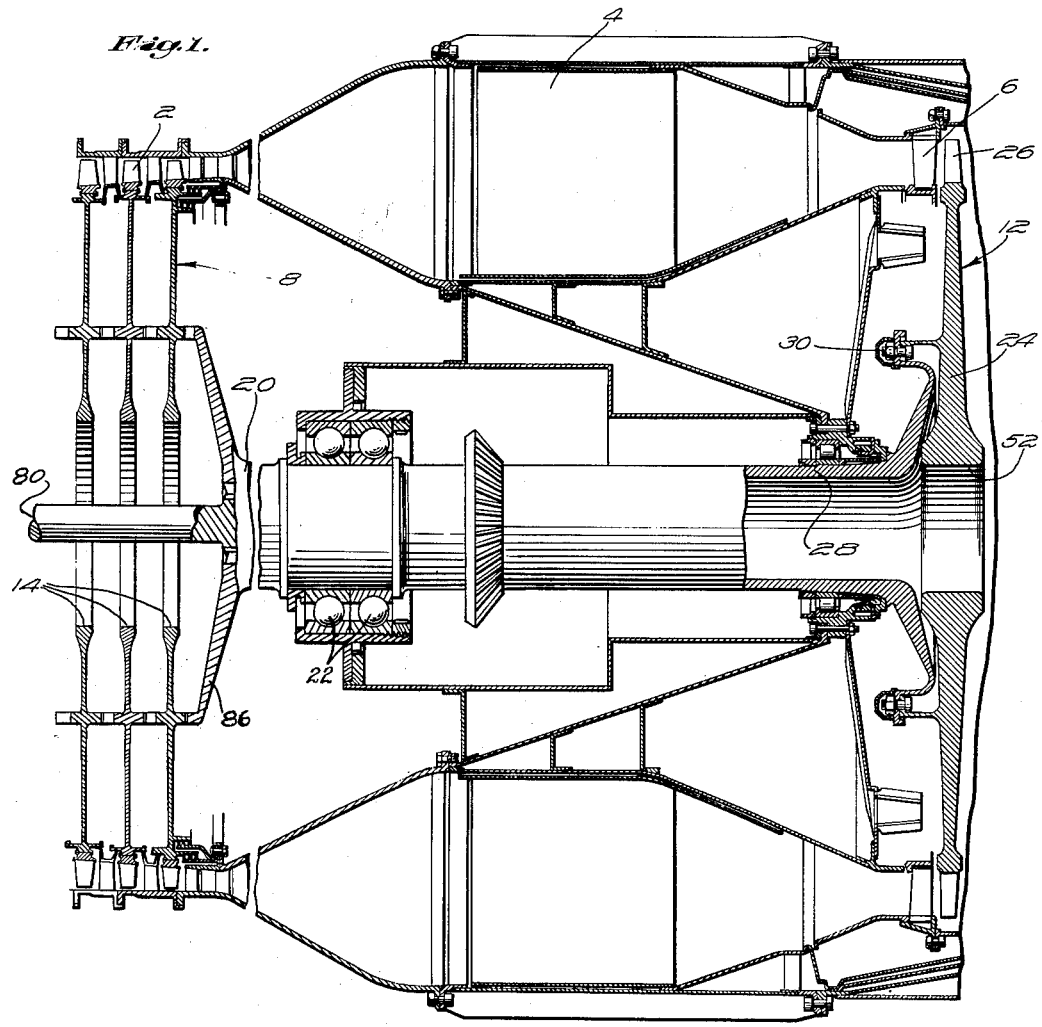
Fig. 1 is a fragmentary sectional view of a part of a gas turbine power plant.
Figure 2:
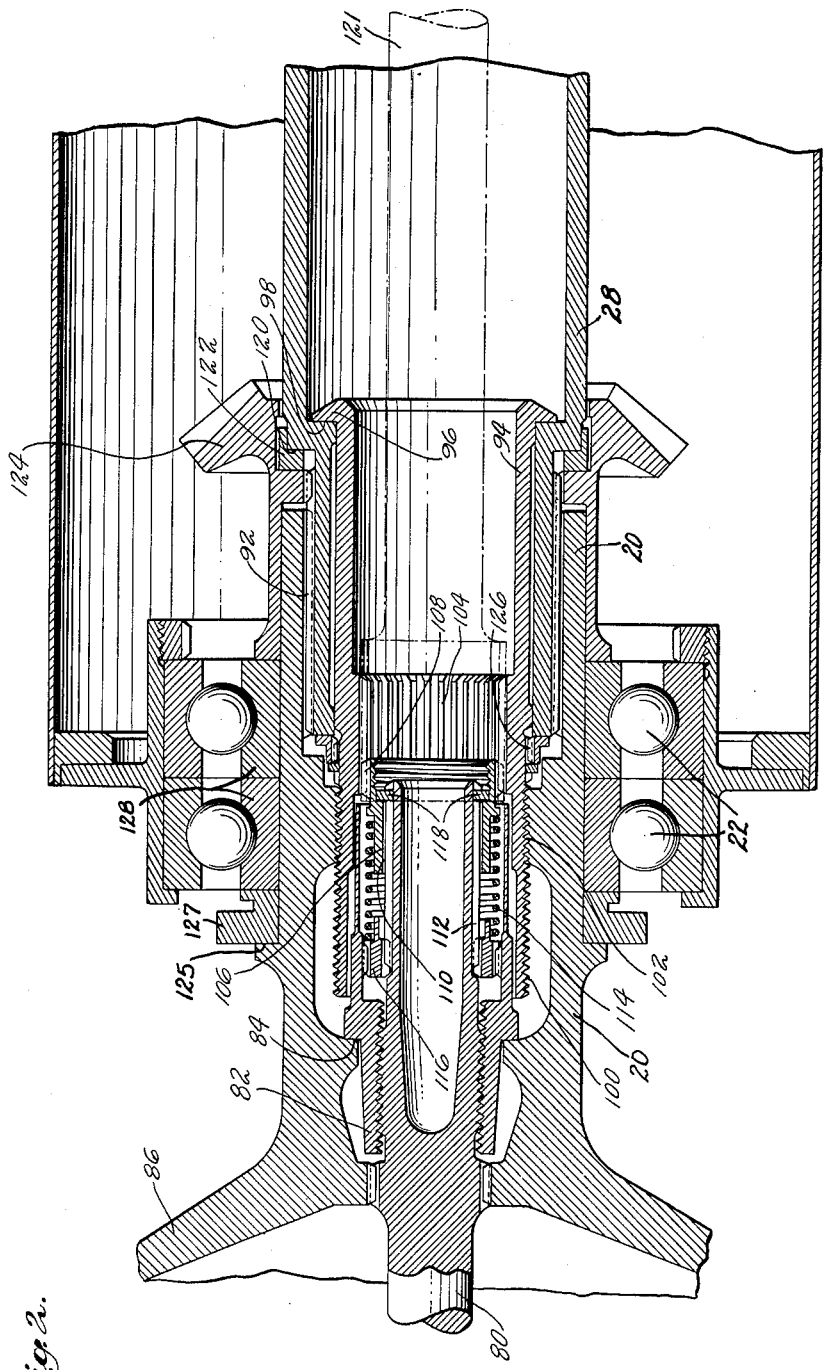
Fig. 2 is a fragmentary sectional view on a larger scale showing the arrangement for holding the rotors together.

Referring first to Fig. 1, the compressor 2 supplies air to one or more combustion chambers 4 in which fuel is mixed with the air and burned to supply power for the turbine 6. The compressor rotor 8 is journalled at its downstream end in bearings 22 located within the annular arrangement of combustion chamber, and the turbine rotor 12 is connected to the compressor rotor in alignment therewith so that the rotors operate in unison. In the arrangement shown the compressor is made up of a number of separate discs 14 which are held together and to an end bell 86 by a central through bolt 80. The end bell has a rearwardly projecting hub or sleeve 20 on the outer surface of which the bearings 22 are positioned. The turbine rotor includes a disc 24 on which the turbine blades 26 are carried and a projecting sleeve or shaft 28 which is secured to the disc as by bolts 30 and extends forwardly to be securely attached to the sleeve 20.

As above stated, the compressor rotor is held together by the central through bolt 80 as disclosed, for example, in the Soderberg Patent No. 2,461,242. The through bolt is held to the downstream end of the rotor by a nut 82 engaging the end of the bolt and a shoulder 84 on the end bell 86. The end bell has the rearwardly projecting sleeve 20 which is secured to the projecting sleeve 28 on the turbine disc. In this arrangement the outer sleeve 20 and inner sleeve 28 have cooperating splines 92 which prevent the sleeves or shafts from turning with respect to each other and are held together by a clamping ring 94. The latter has a projecting flange 96 at one end which engages a shoulder 98 on sleeve 28 and has threads 100 at the opposite end for engagement with a threaded portion 102 of sleeve 20. The clamping ring has internal splines 104 which are engaged by a wrench 121.

The clamping ring 94 is locked in position by a locking ring 106 which has splines 108 on its outer surface engaging with the splines 104 and another row of splines 110 for engagement with splines 112 on the projecting end of the through bolt 80. The locking ring 106 is urged into locking position by a spring 114 which extends between ring 106 and another locking ring 116 which locks the nut 82 with respect to through bolt 80. A holding ring 118 prevents the locking ring 106 from being pushed off the end of the through bolt.

In operation the rotors are placed in axial alignment with the splines 92 engaging and the wrench 121 is then inserted through the sleeve 28 to engage with the splines 104 and to push the locking ring 106 to the left until the splines 108 are out of engagement with splines 104. The clamping ring 94 is then free to be turned by the wrench until the rotors are pulled together to seat a shoulder 120 on sleeve 28 against a limiting stop which in the particular arrangement consists of a spacer ring 122 within the hub of a bevel gear 124. The axial movement of gear 124 is limited by a shoulder 125 on the end bell 80, which supports a spacer ring 127, inner bearing races 123 and the hub of gear 124 against endwise movement on the sleeve 88 forming part of the end bell. Once the sleeves are clamped securely together endwise the wrench is removed and spring 114 urges the locking ring 106 into the locking position shown.

When the rotors are to be separated the insertion of the wrench 121 will disengage the splines 108 and the sleeve or ring 94 may again be turned. During disengagement a stop ring 126 mounted on the clamping ring 94 and in a position to engage the end of the sleeve 28 causes the latter sleeve to be moved endwise from within sleeve 20 as the clamping ring is unscrewed.

It is to be understood that the invention is not limited to the specific embodiment herein illustrated and described, but may be used in other ways without departure from its spirit as defined by the following claims.

I claim:

1. In a gas turbine power plant, a compressor rotor having a rearwardly projecting shaft, a turbine rotor having a forwardly projecting shaft, the adjacent ends of said shafts overlapping at a point between the rotors and having cooperating sets of splines thereon in engagement with one another for preventing relative rotation of the shafts, one of said shafts being hollow, and means for securing said compressor shaft and said turbine shaft together, said securing means including a ring having external threads thereon, one of said shafts having internal threads cooperating with the threads on said ring, the other shaft having a shoulder engaging with said ring for limiting the relative axial movement of said shafts in one direction, cooperating radial surfaces on the shafts for limiting the relative axial movement of said shafts in the other direction, such that when the ring is turned into the threaded shaft, the shafts are locked securely against relative axial movement, in combination with a locking ring for locking the clamping ring against rotation with respect to the shafts, said locking ring being axially slidable within the shafts and having two sets of splines thereon, one set cooperating with splines on said clamping ring and the other set cooperating with splines on one of said shafts, and resilient means urging said locking ring into a position to have both sets of splines in engagement.

2. In a gas turbine power plant, a compressor rotor having a rearwardly projecting shaft, a turbine rotor having a forwardly projecting shaft, the adjacent ends of said shafts overlapping at a point between the rotors and having cooperating sets of splines thereon in engagement with one another for preventing relative rotation of the shafts, one of said shafts being hollow, and means for securing said compressor shaft and said turbine shaft together, said securing means including a ring having external threads thereon, one of said shafts having internal threads cooperating with the threads on said ring, the other shaft having a shoulder engaging with said ring for limiting the relative axial movement of said shafts in one direction, cooperating radial surfaces on the shafts for limiting the relative axial movement of said shafts in the other direction, such that when the ring is turned into the threaded shaft, the shafts are locked securely against relative axial movement, said clamping ring having wrench receiving means centrally thereof by which said clamping ring may be turned, the wrench being insertable through the hollow shaft, in combination with a locking ring for locking the clamping ring against rotation with respect to the shafts, said locking ring being axially slidable within the shafts and having two sets of splines thereon, one set cooperating with splines on said clamping ring and the other set cooperating with splines on one of said shafts, and resilient means urging said locking ring into a position to have both sets of splines in engagement, said locking ring having means thereon projecting into the wrench receiving recess for engagement with the wrench as it is inserted, such that by insertion of the wrench the locking ring is moved against the action of the resilient means to disengage one of said two sets of splines.

3. In a gas turbine power plant, a compressor rotor having a rearwardly projecting shaft, a turbine rotor having a forwardly projecting shaft, the adjacent ends of said shafts overlapping at a point between the rotors and having cooperating sets of splines thereon in engagement with one another for preventing relative rotation of the shafts, one of said shafts being hollow, and means for securing said compressor shaft and said turbine shaft together, said securing means including cooperating radial surfaces on said shafts for limiting the axial movement between said shafts in one direction, a clamping ring within said shafts where they overlap, said clamping ring having a shoulder thereon engaging with one of said shafts, the other of said shafts having threads thereon, and said ring having threads cooperating with the threads on said other shaft whereby, by turning the ring, the shafts are securely held against axial movement in both directions, and a locking ring for locking the clamping ring against rotation with respect to the shafts, said locking ring and said clamping ring having cooperating means to prevent relative rotation, said locking ring and one of the shafts having other cooperating means by which to prevent relative rotation, resilient means urging said locking ring axially into a position to have both of said cooperating means in operative relation, said locking ring being axially movable by a wrench inserted through the hollow shaft to disengage at least one of said cooperating means to provide for turning of the clamping ring.

4. Means for securing together, in axial alignment, two shafts the adjacent ends of which overlap, said overlapping ends having cooperating sets of splines engaging one another for preventing relative rotation of the shafts, one of said shafts being hollow, said securing means including a ring having external threads thereon, one of said shafts having internal threads cooperating with the threads on said ring, the other shaft having a shoulder engaging with said ring for limiting the relative axial movement of said shafts in one direction, cooperating radial surfaces on the shafts for limiting the relative axial movement of said shafts in the other direction, such that when the ring is turned into the threaded shaft, the shafts are locked securely against relative axial movement, in combination with a locking ring for locking the clamping ring against rotation with respect to the shafts, said locking ring being axially slidable within the shaft and having two sets of splines thereon, one set cooperating with splines on said clamping ring and the other set cooperating with splines on one of said shafts, and resilient means urging said locking ring into a position to have both sets of splines in engagement.

5. Means for securing together, in axial alignment, two shafts the adjacent ends of which overlap, said overlapping ends having cooperating sets of splines engaging one another for preventing relative rotation of the shafts, one of said shafts being hollow, said securing means including a ring having external threads thereon, one of said shafts having internal threads cooperating with the threads on said ring, the other shaft having a shoulder engaging with said ring for limiting the relative axial movement of said shafts in one direction, cooperating radial surfaces on the shafts for limiting the relative axial movement of said shafts in the other direction, such that when the ring is turned into the threaded shaft, the shafts are locked securely against relative axial movement, said clamping ring having wrench receiving means centrally thereof by which said clamping ring may be turned, the wrench being insertable through the hollow shaft, in combination with a locking ring for locking the clamping ring against rotation with respect to the shafts, said locking ring being axially slidable within the shafts and having two sets of splines thereon, one set cooperating with splines on said clamping ring and the other set cooperating with splines on one of said shafts, and resilient means urging said locking ring into a position to have both sets of splines in engagement, said locking ring having means thereon projecting into the wrench receiving recess for engagement with the wrench as it is inserted, such that by insertion of the wrench the locking ring is moved against the action of the resilient means to disengage one of said two sets of splines.

6. Means for securing together, in axial alignment, two shafts the adjacent ends of which overlap with the overlapping ends having cooperating means for preventing relative rotation between the shafts but permitting relative axial movement, one of said shafts being hollow, said securing means including cooperating radial surfaces on said shafts for limiting the axial movement between said shafts in one direction, a clamping ring within said shafts where they overlap, said clamping ring having a shoulder thereon engaging with one of said shafts, the other of said shafts having threads thereon, and said ring having threads cooperating with the threads on said other shaft whereby, by turning the ring, the shafts are securely held against axial movement in both directions, and a locking ring for locking the clamping ring against rotation with respect to the shafts, said locking ring and said clamping ring having cooperating means to prevent relative rotation, said locking ring and one of the shafts having other cooperating means by which to prevent relative rotation, resilient means urging said locking ring axially into a position to have both of said cooperating means in operative relation, said locking ring being axially movable by a wrench inserted through the hollow shaft to disengage at least one of said cooperating means to provide for turning of the clamping ring.

References Cited in the file of this patent

UNITED STATES PATENTS

| | | |
|---|---|---|
| 2,052,241 | Morgan | Aug. 25, 1936 |
| 2,099,108 | Fox | Nov. 16, 1937 |
| 2,266,283 | Spengler | Dec. 16, 1941 |
| 2,300,711 | Staerker | Nov. 3, 1942 |
| 2,516,066 | McLeod et al. | July 18, 1950 |
| 2,550,580 | McLeod et al. | Apr. 24, 1951 |

FOREIGN PATENTS

| | | |
|---|---|---|
| 9,760 | Great Britain | 1903 |
| 710,454 | France | June 8, 1931 |